(12) United States Patent
Qiu et al.

(10) Patent No.: US 12,136,393 B1
(45) Date of Patent: Nov. 5, 2024

(54) COMPENSATION CIRCUIT, COMPENSATION METHOD AND DISPLAY PANEL

(71) Applicant: HKC CORPORATION LIMITED, Shenzhen (CN)

(72) Inventors: Bin Qiu, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/671,092

(22) Filed: May 22, 2024

(30) Foreign Application Priority Data

Jul. 7, 2023 (CN) .......................... 202310827872.4

(51) Int. Cl.
*G09G 3/3233* (2016.01)
*G09G 3/20* (2006.01)

(52) U.S. Cl.
CPC .......... *G09G 3/3233* (2013.01); *G09G 3/2007* (2013.01); *G09G 2320/0233* (2013.01)

(58) Field of Classification Search
CPC .......... G09G 3/3233; G09G 2320/0233; G09G 3/2007
See application file for complete search history.

(56) References Cited

U.S. PATENT DOCUMENTS

| | | | |
|---|---|---|---|
| 2007/0075939 A1 | 4/2007 | Cho et al. | |
| 2009/0027377 A1* | 1/2009 | Kwon | G09G 3/3233 345/214 |
| 2011/0205206 A1* | 8/2011 | Yoo | G09G 3/3275 345/82 |
| 2018/0005579 A1 | 1/2018 | Brahma et al. | |
| 2021/0233477 A1* | 7/2021 | Li | G09G 3/3283 |

FOREIGN PATENT DOCUMENTS

| | | |
|---|---|---|
| CN | 105210139 | 12/2015 |
| CN | 109064956 | 12/2018 |
| CN | 109427298 | 3/2019 |
| CN | 109616050 | 4/2019 |
| CN | 110136638 | 8/2019 |
| CN | 110491340 | 11/2019 |
| CN | 110956928 | 4/2020 |
| CN | 112908262 | 6/2021 |
| KR | 20220150489 | 11/2022 |

OTHER PUBLICATIONS

CNIPA, Notification to Grant Patent Right for Invention for CN Application No. 202310827872.4, Aug. 11, 2023.

* cited by examiner

*Primary Examiner* — Muhammad N Edun
(74) *Attorney, Agent, or Firm* — Hodgson Russ LLP

(57) ABSTRACT

A compensation circuit includes at least one driving unit, each the driving unit includes a first response switch and a storage capacitor, a first end of the first response switch is connected to a light emitting unit, and a second end of the first response switch is connected to a power supply; the storage capacitor has a first electrode plate and a second electrode plate opposite to the first electrode plate, the first electrode plate is connected to a control end of the first response switch, the second electrode plate is connected to a second end of the first response switch, the compensation circuit further includes a subtractor provided with a first detection port, a second detection port and an output port, and a controller provided with a receiving port and a feedback port.

17 Claims, 4 Drawing Sheets

COMPENSATION CIRCUIT, COMPENSATION METHOD AND DISPLAY PANEL

CROSS-REFERENCE TO RELATED APPLICATIONS

The present disclosure claims priority to Chinese Patent Application No. 202310827872.4, titled "Compensation Circuit, Compensation Method and Display Panel," filed Jul. 7, 2023, the entire disclosure of which is incorporated herein by reference.

TECHNICAL FIELD

The present disclosure belongs to the field of display technology, and particularly to, a compensation circuit, a compensation method and a display panel.

BACKGROUND

In the display, an Organic light emitting Diode (OLED) has the advantages such as no backlight, a high contrast, a self-luminous, a fast response, a wide viewing angle, a high brightness.

In the OLED display, the signal of the data line directly affects the brightness of the display. A Thin Film Transistor (TFT) switch is provided in the OLED display, and the conduction of the line is controlled by the TFT switch. However, the parasitic capacitors exist in the gates of the TFT switches and other lines, and when the signals of the data lines are loaded to the gates of the TFT switches, the parasitic capacitors affect the voltage applied to the TFT switches, thus the opening of the TFT switches is affected, resulting in different values of the currents flowing through the OLEDs, such that the brightness of the OLED display is affected.

SUMMARY

The purpose of the present disclosure is to provide a compensation circuit, a compensation method, and a display panel, which can effectively reduce the effect of parasitic capacitor on the brightness of the display.

Other features and advantages of the present disclosure will become apparent by the following detailed description, or will be partially acquired by applying the present disclosure.

According to an aspect of the embodiment of the present disclosure, the present disclosure provides a compensation circuit, the compensation circuit includes:

at least one driving unit, wherein each the driving unit includes a first response switch and a storage capacitor, wherein a first end of the first response switch is connected to a light emitting unit, and a second end of the first response switch is connected to a power supply;

wherein the storage capacitor has a first electrode plate and a second electrode plate opposite to the first electrode plate, wherein the first electrode plate is connected to a control end of the first response switch, the second electrode plate is connected to a second end of the first response switch, and the control end of the first response switch is configured to light up the light emitting unit in response to a data signal provided by a data line;

wherein the compensation circuit further includes:

a subtractor provided with a first detection port, a second detection port and an output port;

a controller provided with a receiving port and a feedback port;

wherein the first detection port is connected to the first electrode plate and the second detection port is connected to the second electrode plate;

wherein the receiving port of the controller is connected to the output port of the subtractor, and the feedback port of the controller is configured to provide a compensation signal to the data line; and wherein the subtractor is configured to calculate a voltage difference between a first voltage data of the first detection port and a second voltage data of the second detection port, and transmit the voltage difference to the controller, and the controller is configured to provide the compensation signal to the data line based on the voltage difference.

In one embodiment, the driving unit further includes a second response switch, wherein a first end of the second response switch is connected to the data line, a second end of the second response switch is connected to a connection joint between the storage capacitor and the first response switch, a control end of the second response switch is connected to a scanning line, and the second response switch is configured to make the first end and the second end of the second response switch to be conducted in response to a scanning signal of the scanning line.

In one embodiment, the compensation circuit further includes a driver chip, wherein the driver chip is connected to the data line to provide the data signal to the data line;

wherein the feedback port of the controller is connected to the driver chip to provide a feedback signal to the driver chip, and the driver chip is configured to provide the compensation signal based on the feedback signal; or the feedback port of the controller is connected to the data line to provide the compensation signal on a basis of the data signal according to the data signal.

In one embodiment, the compensation circuit includes a plurality of the driving units, wherein the first detection port of the subtractor is connected to the first electrode plate in each the driving unit respectively, the second detection port is connected to the second electrode plate in each the driving unit respectively, and the feedback port of the controller provides the compensation signal to the data line in each the driving unit respectively.

In addition, in order to solve the above problem, the present disclosure also provides a compensation method, applied to a compensation circuit, the compensation circuit includes: at least one driving unit, wherein each the driving unit includes a first response switch and a storage capacitor, wherein a first end of the first response switch is connected to a light emitting unit, and a second end of the first response switch is connected to a power supply;

wherein the storage capacitor has a first electrode plate and a second electrode plate set opposite to each other, wherein the first electrode plate is connected to a control end of the first response switch, the second electrode plate is connected to a second end of the first response switch, and the control end of the first response switch is configured to light up the light emitting unit in response to a data signal provided by a data line;

wherein the compensation circuit further includes:

a subtractor provided with a first detection port, a second detection port and an output port; and a controller provided with a receiving port and a feedback port;

wherein the first detection port is connected to the first electrode plate and the second detection port is connected to the second electrode plate; and wherein the receiving port of the controller is connected to the output port of the subtractor, and the feedback port of the controller is configured to provide a compensation signal to the data line;

wherein the compensation method includes:

generating a detection instruction;

controlling the subtractor to obtain first voltage data of the first detection port and second voltage data of the second detection port based on the detection instruction, calculating a difference between the first voltage data and the second voltage data to generate a voltage difference, and outputting the voltage difference to the controller;

controlling the controller to receive the voltage difference and generate the compensation signal based on the voltage difference; and providing the compensation signal to the data line.

In one embodiment, the generate the compensation signal based on the voltage difference includes:

extracting a preset reference standard value;

comparing the voltage difference with the reference standard value to generate a comparison result; and generating the compensation signal based on the comparison result.

In one embodiment, the compensation circuit includes a plurality of driving units, wherein the first detection port of the subtractor is connected to the first electrode plate in each the driving unit respectively, and the second detection port is connected to the second electrode plate in each the driving unit respectively;

before the extracting the preset reference standard value includes:

obtaining the voltage difference between a voltage of the first electrode plate and a voltage of the second electrode plate of the storage capacitor in each the driving unit, respectively, and generating a reference table based on the voltage difference; and selecting a maximum value from the reference table as the reference standard value, and saving the reference standard value.

In one embodiment, the driving unit further includes a second response switch, a first end of the second response switch is connected to the data line, a second end of the second response switch is connected to a connection joint between the storage capacitor and the first response switch, and a control end of the second response switch is connected to a scanning line;

before the obtaining the voltage difference between the voltage of the first electrode plate and the voltage of the second electrode plate of the storage capacitor in each the driving unit, respectively, includes:

providing a scanning signal to the second response switch of each the driving unit in turn, wherein the second response switch is configured to make the first end and the second end of the second response switch to be conducted in response to the scanning signal; and providing a same amount of charge to the storage capacitor of each the driving unit under the same conduction time of the first end and the second end of the second response switch.

In one embodiment, a plurality of the data lines are provided, and the plurality of the driving units are connected to the plurality of the data lines one-in-one;

the compensation method further includes:

providing a standard grayscale voltage to each the data line respectively to obtain a standard voltage difference between the first electrode plate and the second electrode plate of the storage capacitor in the driving unit;

providing grayscale voltages of different magnitudes to other data lines adjacent to a current data line, and providing the standard grayscale voltage to the current data line simultaneously;

obtaining an actual voltage difference between the first electrode plate and the second electrode plate of the storage capacitor in the driving unit; and calculating a compensation voltage provided to the current data line based on the standard voltage difference and the actual voltage difference, and loading the compensation voltage onto the current data line.

In addition, in order to solve the above problem, the present disclosure also provides a display panel, including a light emitting unit and a compensation circuit as mentioned above, where the light emitting unit is connected to a first end of the first response switch, and the display panel comprises a display area and a non-display area, wherein the non-display area is provided at a periphery of the display area, the subtractor and the controller are provided at the non-display area, and the light emitting unit is located in the display area.

In addition, in order to solve the above problem, the present disclosure also provides The present application also provides a display panel, the display panel includes a color barrier layer and a compensation circuit as mentioned above, the color barrier layer is provided on a side of a quantum dot diffusion panel far away from a reflective layer.

In the present disclosure, a value of the parasitic capacitor is represented by the voltage at two ends of the storage capacitor. A first detection port of the subtractor detects a voltage of a first electrode plate of the storage capacitor, i.e., the first voltage data, and a second detection port of the subtractor detects a voltage of a second electrode plate of the storage capacitor, i.e., the second voltage data. The subtractor calculates a voltage difference between the first voltage data and the second voltage data, and transmits the voltage difference to a receiving port of the controller via the output port. The controller calculates, based on the voltage difference, the voltage of the compensation signal to be provided to the data line, thereby reducing the effect of the parasitic capacitor on the brightness of the display.

It should be understood in the present disclosure that the above general description and the later detailed description are exemplary and explanatory only and do not limit to the present disclosure.

BRIEF DESCRIPTION OF THE DRAWINGS

The accompanying drawings herein are incorporated into and form a part of the specification, illustrate embodiments in accordance with the present disclosure, and are used in conjunction with the specification to explain the principles of the present disclosure. It will be apparent that the accompanying drawings in the following description are only some of the embodiments of the present disclosure, and that other drawings may be obtained from these drawings without creative labor for those skilled in the art.

DETAILED DESCRIPTION OF THE EMBODIMENTS

Embodiments will now be described more fully with reference to the accompanying drawings. However, embodiments can be implemented in a variety of forms and should not be limited to the examples set forth herein; rather, these embodiments allow the present disclosure to be more comprehensive and complete and conveys the idea of the embodiments in a comprehensive manner to those skilled in the art.

Embodiment I

Currently employed process conditions, both for low temperature polysilicon TFTs and Indium Gallium Zinc Oxide (IGZO) TFTs, have manufacturing process differences, which result in differences in the line structure of each OLED unit in the display panel. Since different OLED units have different parasitic capacitances, different currents flow through the OLEDs, leading to different brightness of the OLEDs, thus the brightness of the display panel lacks of uniformity.

Figure 1:
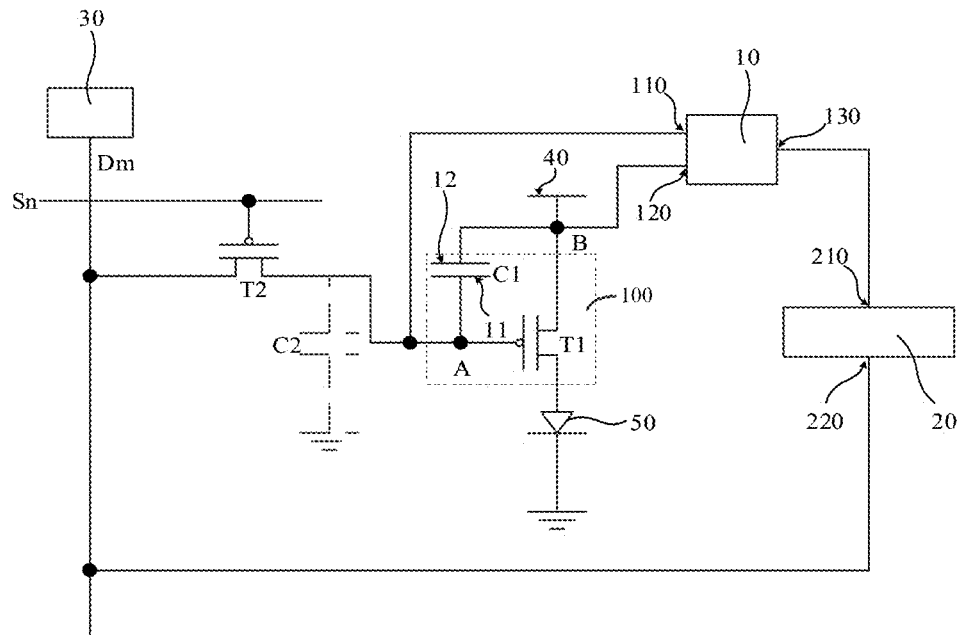
FIG. 1 is a schematic diagram showing a controller of a compensation circuit directly connecting to a data line according to a first embodiment of the present disclosure.
Figure 2:
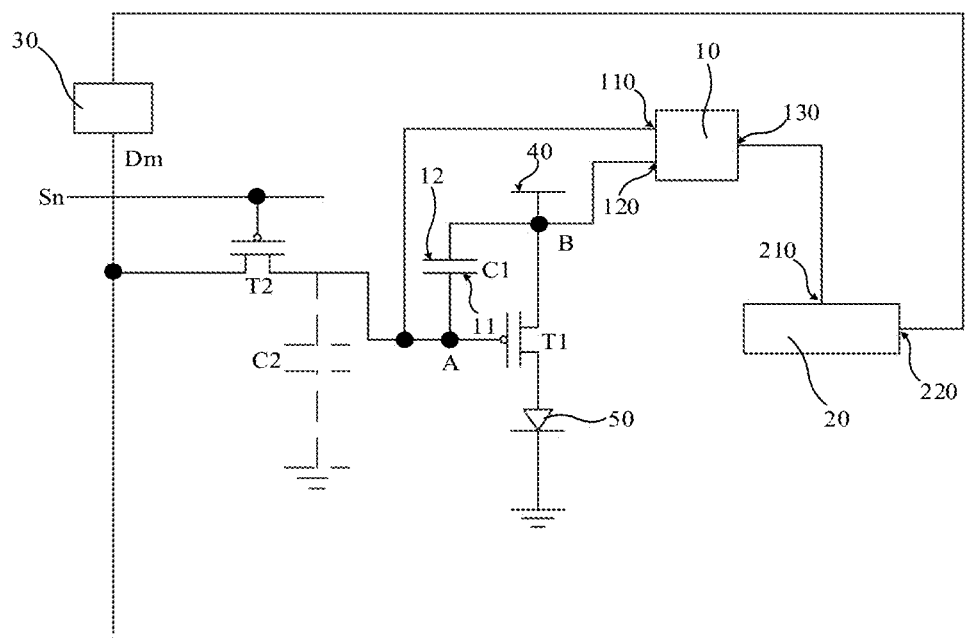
FIG. 2 is a schematic diagram showing the controller of the compensation circuit connecting to a driver chip according to the first embodiment of the present disclosure.

Referring to FIGS. 1 and 2, the present disclosure provides a compensation circuit. The compensation circuit includes at least one driving unit 100, the driving unit 100 including a first response switch T1 and a storage capacitor C1. The first response switch T1 may be a TFT switch. A first end of the first response switch T1 is connected to a light emitting unit 50, and a second end of the first response switch T1 is connected to a power supply 40. The light emitting unit 50 may be an OLED unit, and the power supply 40 is configured to supply power to the driving unit 100 and provide a current for lighting up the light emitting unit 50.

The storage capacitor C1 has a first electrode plate 11 and a second electrode plate 12 opposite to the first electrode plate 11. The first electrode plate 11 is connected to a control end of the first response switch T1, and the second electrode plate 12 is connected to a second end of the first response switch T1. A control end of the first response switch T1 is configured to respond to data signals provided by the data line Dm, so as to light up the light emitting unit 50. The storage capacitor C1 is configured to maintain an on state of the first response switch T1. For example, with the cooperation of the scanning line Sn, each the driving unit 100 is turned on in sequence based on its row and column. In order to enable the light emitting unit 50 to be lighted up for a sustained period of time, the data line Dm provides a data signal, which acts not only on the control end of the first response switch T1, but also on the storage capacitor C1 for cooperation with the power supply 40 to supply the power to the second electrode plate 12 of the storage capacitor C1, so that a certain charge is stored in the storage capacitor C1. After the driving unit 100 is turned off, the storage capacitor C1 releases the stored charge, the charge acts on the control end of the first response switch T1, such that the on state of the first response switch T1 is maintained since the control end of the first response switch T1 is continuously acted upon by the charge.

The compensation circuit further includes a subtractor 10 and a controller 20. The subtractor 10 can be a type of basic integrated operational amplifier (IAM) circuit. The controller 20 can also be a logic controller, and the controller 20 serves to operate and process data. The subtractor 10 sends the calculated data to the controller 20, and the controller 20 performs voltage compensation on the data line Dm based on the calculation result.

Specifically, the subtractor 10 is provided with a first detection port 110 and a second detection port 120. The first detection port 110 is connected to the first electrode plate 11, and the second detection port 120 is connected to the second electrode plate 12. Since the parasitic capacitor C2 exists at the gate of the first response switch T1, the parasitic capacitor C2 can act on the storage capacitor C1. The value of the parasitic capacitor C2 is not easy to measure, and for this reason, the value of the parasitic capacitor C2 is reflected by detecting the voltages of the two electrode plates of the storage capacitor C1. The first electrode plate 11 is connected to the first detection port 110 to detect the first voltage data, and the second electrode plate 12 is connected to the second detection port 120 to detect the second voltage data. The parasitic capacitor C2 is reflected by the first voltage data and the second voltage data. The dashed portions in FIGS. 1 and 2 are equivalent schematic diagrams of the parasitic capacitor C2.

In addition, the first electrode plate 11 and the first response switch T1 are connected at a point A, and the second electrode plate 12 and the first response switch T1 are connected at a point B. The first detection port 110 may be directly connected to the point A, and the second detection port 120 may be directly connected to the point B.

The controller 20 has a receiving port 210 and a feedback port 220, and the subtractor 10 is further provided with an output port 130. The receiving port 210 of the controller 20 is connected to the output port 130 of the subtractor 10, and the feedback port 220 of the controller 20 is configured to provide a compensation signal to the data line Dm. The subtractor 10 is configured to calculate the voltage difference between a first voltage data of the first detection port 110 and a second voltage data of the second detection port 120, and transmit the voltage difference to the receiving port 210 of the controller 20 via the output port 130, and the controller 20 is configured to provide the compensation signal to the data line Dm based on the voltage difference.

Specifically, the parasitic capacitor C2 is indirectly reflected by the voltage difference between the first voltage data and the second voltage data, and after getting the refection of the parasitic capacitor C2, the controller 20 provides the compensation signal to the data line Dm, so as to reduce the influence of the parasitic capacitor C2 through the compensation signal. Since different driving units 100 produce different parasitic capacitors C2, the values of the compensation signal are also different. The compensation signal is usually a voltage signal.

In the embodiment, the value of the parasitic capacitor C2 is represented by the voltage at two ends of the storage capacitor C1. The first detection port 110 of the subtractor 10 detects the voltage of the first electrode plate 11 of the storage capacitor C1, i.e., the first voltage data, and the second detection port 120 of the subtractor 10 detects the voltage of the second electrode plate 12 of the storage capacitor C1, i.e., the second voltage data. The subtractor 10 calculates the voltage difference between the first voltage data and the second voltage data, and transmits the voltage difference via the output port 130 to the receiving port 210 of the controller 20. The controller 20 calculates, based on the voltage difference, the value of the voltage of the compensation signal to be provided to the data line Dm, so as to reduce the effect of the parasitic capacitor C2 on the brightness of the display.

Further, the driving unit 100 further includes a second response switch T2, a first end of the second response switch T2 is connected to the data line Dm, a second end of the second response switch T2 is connected to a connection joint between the storage capacitor C1 and the first response switch T1, a control end of the second response switch T2 is connected to a scanning line Sn, and the second response switch T2 responds to a scanning signal of the scanning line Sn to make the first end of the second response switch T2 and the second end to be conducted. The parasitic capacitor C2 is provided between the control end of the first response switch T1 and the second end of the second response switch T2.

When the light emitting unit 50 needs to be lighted up, a scanning signal is provided to the control end of the second response switch T2 of the driving unit 100, and the second response switch T2 responds to the scanning signal to make the first end and the second end of the second response switch T2 to be conducted, so that a data signal from the data line Dm is loaded to the control end of the first response switch T1 through the second response switch T2. The second response switch T2 may also be a TFT switch. The first response switch T1 and the second response switch T2 each may be an N-type TFT switch or a P-type TFT switch. The second response switch T2 can be configured to control the time for providing a data signal to the first response switch T1, thereby controlling the time of lighting of the light emitting unit 50. The control end of the response switch is a gate, the first end of the response switch is a source and the second end of the response switch is a drain. Or, the first end can be the drain and the second end can be the source.

The compensation circuit also includes a driver chip 30, the driver chip 30 is connected to the data line Dm, and the driver chip 30 is configured to provide a data signal to the data line Dm. The present disclosure provides two compensation methods for the controller 20 to provide the compensation signal to the data line Dm.

Referring again to FIG. 2, the first compensation method is indirect compensation, where the feedback port 220 of the controller 20 is connected to the driver chip 30, the controller 20 provides a feedback signal to the driver chip 30, and the driver chip 30 provides the compensation signal based on the feedback signal on the basis of the data signal; specifically, the controller 20 generates the feedback signal based on the voltage difference, and the controller 20 outputs the feedback signal to the driver chip 30 through the feedback port 220, and the driver chip 30 superimposes the compensation signal on the originally provided data signal based on the feedback signal. The driver chip 30 generates the compensation signal by calculating based on the feedback signal.

Referring again to FIG. 1, the second compensation method is direct compensation, where the feedback port 220 of the controller 20 is connected to the data line Dm, and the controller 20 provides the compensation signal on the basis of the data signal. The compensation signal is generated by the controller 20 based directly on the voltage difference. The feedback port 220 of the controller 20 is directly connected to the data line Dm, and the generated compensation signal is directly superimposed on the data signal of the data line Dm without passing through the driver chip 30, such that the calculation of the driver chip 30 isn't needed, the arithmetic power of the driver chip 30 is saved, and the compensation signal can be loaded onto the data line Dm as soon as possible.

Figure 3:
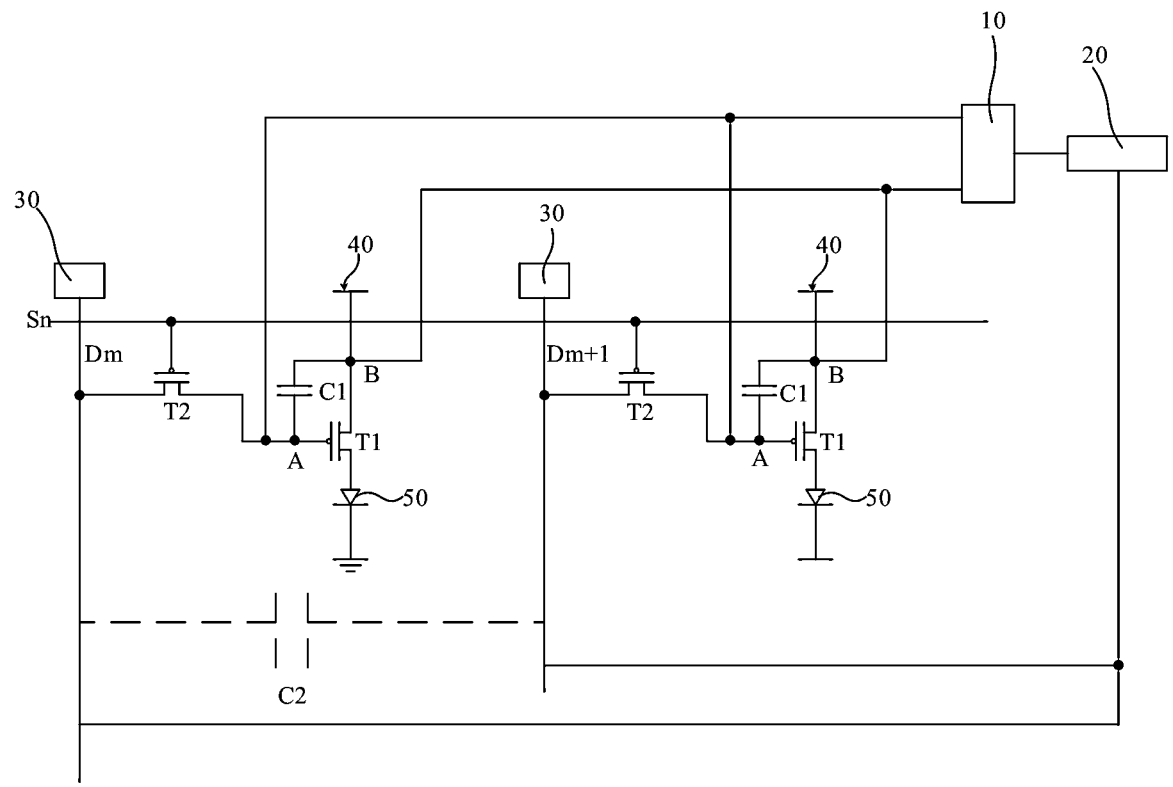
FIG. 3 is a schematic diagram showing the controller of the compensation circuit directly connecting to the data lines of two adjacent driving units according to the first embodiment of the present disclosure.
Figure 4:
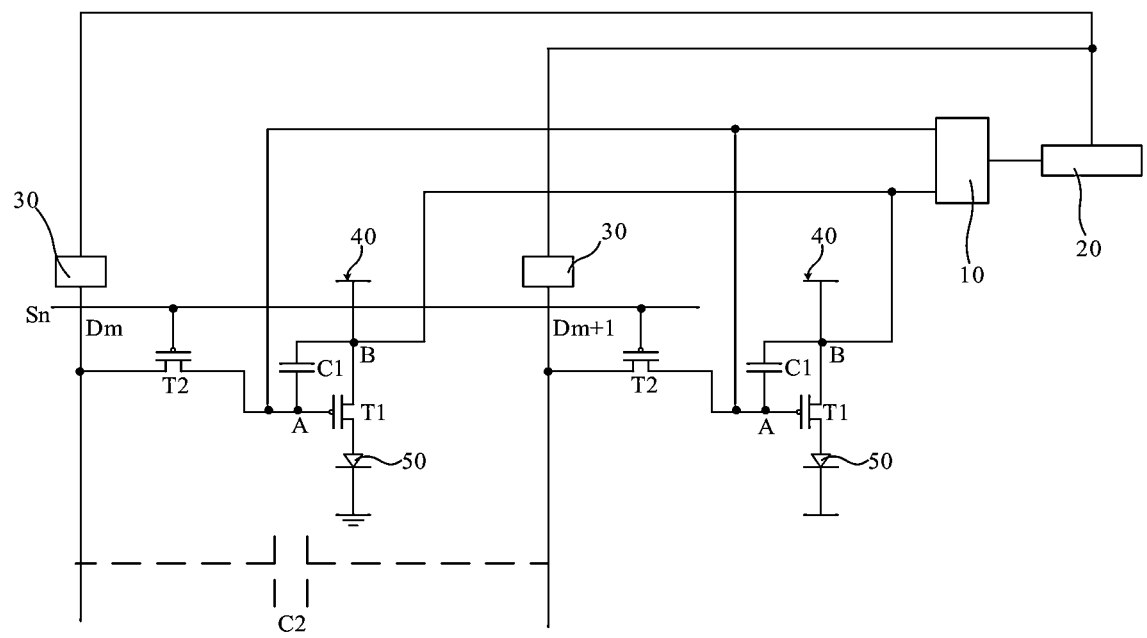
FIG. 4 is a schematic diagram showing the controller connecting to driver chips of the two adjacent driving units according to the first embodiment of the present disclosure.

Referring to FIGS. 3 and 4, a plurality of the driving units 100 are provided, the first detection port 110 of the subtractor 10 is connected to the first electrode plate 11 in each the driving unit 100, the second detection port 120 is connected to the second electrode plate 12 in each the driving unit 100, and the feedback port 220 of the controller 20 provides the compensation signal to the data line Dm in each the driving unit 100, respectively.

At least one light emitting unit 50 is provided in each the driving unit 100, and in order to save space for arranging the display panel 60, a subtractor 10 can correspond to a plurality of driving units 100. In order to avoid signal crosstalk, each the driving unit 100 is turned on sequentially, such that the subtractor 10 can detect each the driving unit 100 separately.

One subtractor 10 may correspond to two driving units 100 or three driving units 100, or one subtractor 10 may correspond to more than three driving units 100. The driving units 100 present a matrix distribution of rows and columns in the display panel 60. One subtractor 10 may also correspond to one row of driving units 100 or to one column of driving units 100. Of course, in order to further reduce the number of devices, the driving units 100 in the entire display panel 60 can be detected by one subtractor 10. Usually, one subtractor 10 is in corporation with one controller 20, which facilitates the simplification of the structure.

Embodiment II

Figure 5:
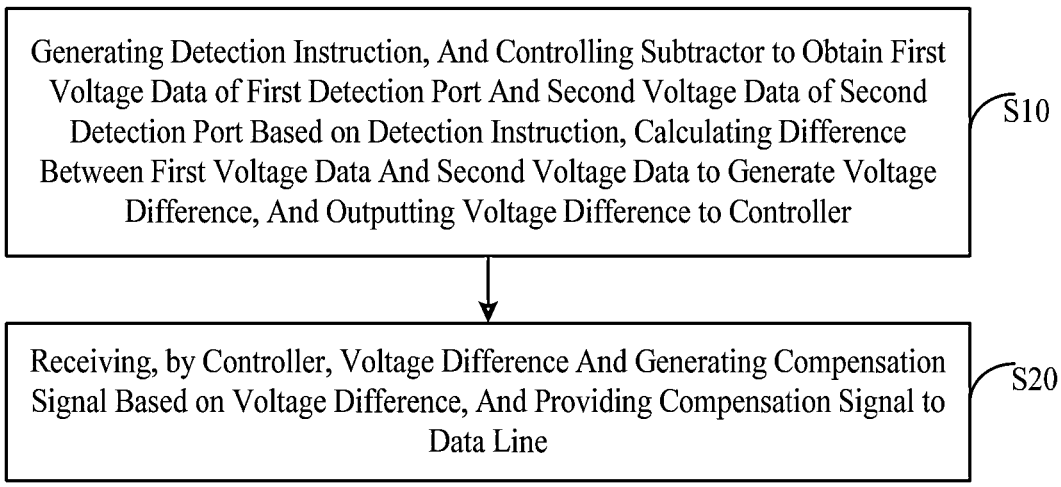
FIG. 5 is a flowchart of a compensation method according to a second embodiment of the present disclosure.

Referring to FIG. 5, the present disclosure also provides a compensation method, the compensation method is applied to a compensation circuit, the compensation circuit includes a driving unit 100, the driving unit 100 includes a first response switch T1 and a storage capacitor C1, the first end of the first response switch T1 is connected to a light emitting unit 50, the second end of the first response switch T1 is connected to a power supply 40. The storage capacitor C1 has first electrode plate 11 and a second electrode plate 12 opposite to the first electrode plate 11, the first electrode plate 11 is connected to a control end of the first response switch T1, and the second electrode plate 12 is connected to a second end of the first response switch T1. The control end of the first response switch T1 is configured to respond to a data signal provided by the data line Dm to light up the light emitting unit 50. The compensation circuit further includes a subtractor 10 and a controller 20, the subtractor 10 is provided with a first detection port 110 and a second detection port 120, the first detection port 110 is connected to the first electrode plate 11, the second detection port 120 is connected to the second electrode plate 12, the controller 20 has a receiving port 210 and a feedback port 220, the subtractor 10 is further provided with an output port 130, the receiving port 210 of the controller 20 is connected to the output port 130 of the subtractor 10. The method of compensation includes:

Step S10, generating a detection instruction, and controlling the subtractor 10 to obtain a first voltage data of the first detection port 110 and a second voltage data of the second detection port 120 based on the detection instruction, calculating a difference between the first voltage data and the second voltage data to generate a voltage difference, and outputting the voltage difference to the controller 20. The magnitude of the parasitic capacitor C2 is reflected by the voltage difference. The generated detection instructions may be generated by the controller 20, and the detection instructions may be generated periodically, such as by presetting a detection cycle, generating the detection instructions periodically based on the detection cycle, and compensating the voltage based on the detection instructions, and providing the same compensation signal each time when the same driving unit 100 is started before the next detection. In addition, since various signals of the line and various devices may drift as the time of use increases, the operating time of the driving unit 100 can be detected and a detection instruction is generated based on the length of the operating time. Further, the detection instruction may also be generated by manual input.

Step S20, receiving, by the controller, the voltage difference and generating a compensation signal based on the voltage difference, and providing the compensation signal to the data line Dm. The controller 20 can perform arithmetic processing on the data, and calculate a voltage magnitude of the compensation signal based on the magnitude of the voltage difference.

In the embodiment, the magnitude of the parasitic capacitor C2 is reflected by the voltage at the two ends of the storage capacitor C1. The control subtractor 10 calculates a voltage difference between the first voltage data and the second voltage data, and transmits the voltage difference via the output port 130 to the receiving port 210 of the controller 20. The controller 20 calculates, based on the voltage difference, the voltage magnitude of the compensation signal needed to be provided to the data line Dm, and loads the compensation signal onto the data line Dm, thereby offsetting the parasitic capacitor C2 and reducing the parasitic capacitor C2 on the brightness of the display.

Figure 6:
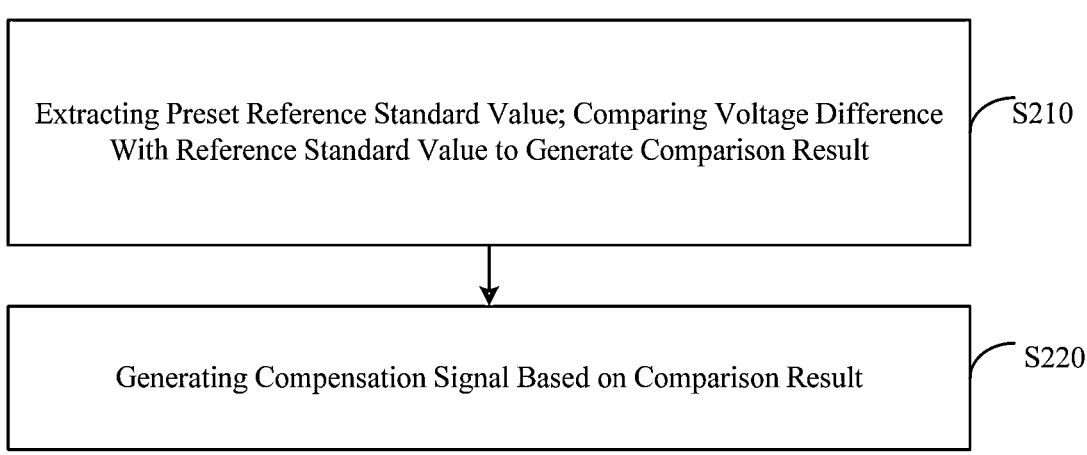
FIG. 6 is a flowchart showing steps of utilizing a reference standard value in the compensation method according to the second embodiment of the present disclosure.

Referring to FIG. 6, the generating the compensation signal based on the voltage difference, includes:

Step S210, extracting a preset reference standard value; comparing the voltage difference with the reference standard value to generate a comparison result; the calculated voltage difference is a result after the influence of the parasitic capacitor C2, and the voltage difference can be compared with the reference standard value not influenced by the parasitic capacitor C2. The reference standard value can also be a value that is less affected by the parasitic capacitor C2. After comparing the voltage difference with the reference standard value for difference, the magnitude of the influence of the parasitic capacitor C2 can be derived, i.e., the comparison result is generated.

Step S220, generating a compensation signal based on the comparison result. The comparison result directly reflects the magnitude of the parasitic capacitor C2, and the comparison result can determine how much voltage needs to be provided to offset the parasitic capacitor C2, thereby generating the compensation signal, the compensation signal includes the magnitude of the compensated voltage, and the compensated voltage is loaded onto the data line Dm so as to abate the influence of the parasitic capacitor C2.

In one aspect, a plurality of the driving units 100 are provided, and a first detection port 110 of the subtractor 10 is connected to the first electrode plate 11 in each the driving unit 100, and a second detection port 120 is connected to the second electrode plate 12 in each the driving unit 100; each of the driving units 100 is provided with a storage capacitor C1 and a first response switch T1. The plurality of the driving units 100 can be detected by one subtractor 10.

Figure 7:
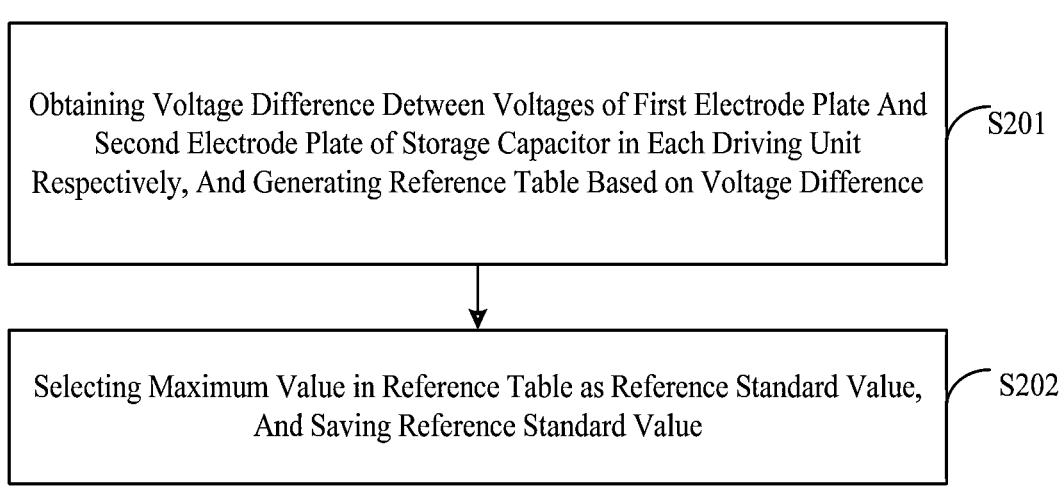
FIG. 7 is a flowchart showing how to generate a reference standard value in the compensation method according to the second embodiment of the present disclosure.

Referring to FIG. 7, before the extracting the preset reference standard value includes:

Step S201, obtaining a voltage difference between the voltages of the first electrode plate 11 and the second electrode plate 12 of the storage capacitor C1 in each the driving unit 100 respectively, and generating a reference table based on the voltage difference. The plurality of driving units 100 are arranged in a matrix-type arrangement in a row-column manner in the display panel 60, and after detecting each of the driving units 100 by the subtractor 10, a voltage difference is obtained in each the driving unit 100. These differences are tallied together to generate the reference table. The reference table may be generated in conjunction with the location of the driving units 100.

For example, the difference is $\Delta V(x, y)$, $\Delta V$ is the difference of a specific voltage, and $(x, y)$ represents the coordinates on the display panel 60. The coordinate positions can quickly determine the magnitude of the parasitic capacitor C2 in each the driving unit 100.

Step S202, selecting the maximum value in the reference table as the reference standard value, and saving the reference standard value. The reference standard value can be saved in the controller 20. The maximum value in the reference table represents the largest difference, that is, the brightness of the light emitting unit 50 is the brightest, and the least affected by the parasitic capacitor C2. It can also be considered that the maximum value in the reference table is essentially unaffected by the parasitic capacitor C2. Using this maximum value as a standard, the other driving units 100 can calculate how much voltage needs to be provided to the light emitting unit 50 to reach the brightest degree. Thus, the maximum value in the reference table is used as a reference standard value.

The driving unit 100 further includes a second response switch T2, a first end of the second response switch T2 is connected to a data line Dm, a second end of the second response switch T2 is connected to a connection joint between the storage capacitor C1 and the first response switch T1, a control end of the second response switch T2 is connected to a scanning line Sn, and the second response switch T2 responds to a scanning signal of the scanning line Sn; the turning on and off of the driving unit 100 is controlled by controlling the turning on and off of the second response switch T2.

Figure 8:
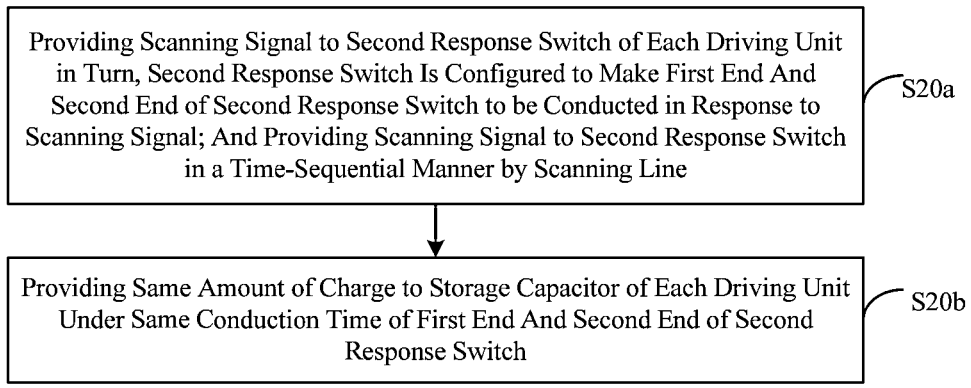
FIG. 8 is a flowchart of step S20a and step S20b of generating the reference standard value in the compensation method according to the second embodiment of the present disclosure.

Referring to FIG. 8, the before obtaining the voltage difference between the voltage of the first electrode plate 11 and the voltage of the second electrode plate 12 of the storage capacitor C1 in each the driving unit 100 separately includes:

Step S20a, providing a scanning signal to the second response switch T2 of each the driving unit 100 in turn, the second response switch T2 is configured to make the first end and the second end of the second response switch T2 to be conducted in response to the scanning signal; and providing the scanning signal to the second response switch T2 in a time-sequential manner by the scanning line Sn, whereby the second response switch T2 can be turned on in turn.

Step S20b, providing a same amount of charge to the storage capacitor of each the driving unit 100 under the same conduction time of the first end and the second end of the second response switch T2. In the state in which the second response switch T2 is turned on, the same amount of charge is provided to the first response switch T1 by the second response switch T2 under the same time period. The same electrical signal given to each the driving unit 100 is guaranteed to be the same by the same time period and the same amount of charge, ensuring the accuracy of the detection result of the parasitic capacitor C2. The amount of charge is required to ensure that the first response switch T1 is fully turned on.

In order to prevent crosstalk of the signals, the second response switches T2 of each the driving unit 100 are turned on sequentially. That is, only one driving unit 100 is turned on at the same time.

In addition, in the display panel 60, there is an effect of capacitive coupling of adjacent data lines Dm. For example, if there are electrical signals flowing in two adjacent data lines Dm respectively, the electrical signals of the data lines Dm fluctuate at the rising and falling edges, and such fluctuations form a changing magnetic field, which acts on the adjacent data lines Dm, resulting in waveform undulation of the adjacent data lines Dm and inaccurate turn-on voltages provided to the first response switch T1. The dashed portion shown in FIGS. 3 and 4 shows an equivalent schematic diagram of the coupling capacitor C3.

For this purpose, the plurality of the data lines Dm are provided, and each the driving unit 100 is connected to one data line Dm correspondingly; since the coupling capacitor C2 is acted on the first response switch T1 through the storage capacitor C1, the voltage difference between the first electrode plate 11 and the second electrode plate 12 of the storage capacitor C1 can reflect the magnitude of the coupling capacitor C3.

Figure 9:
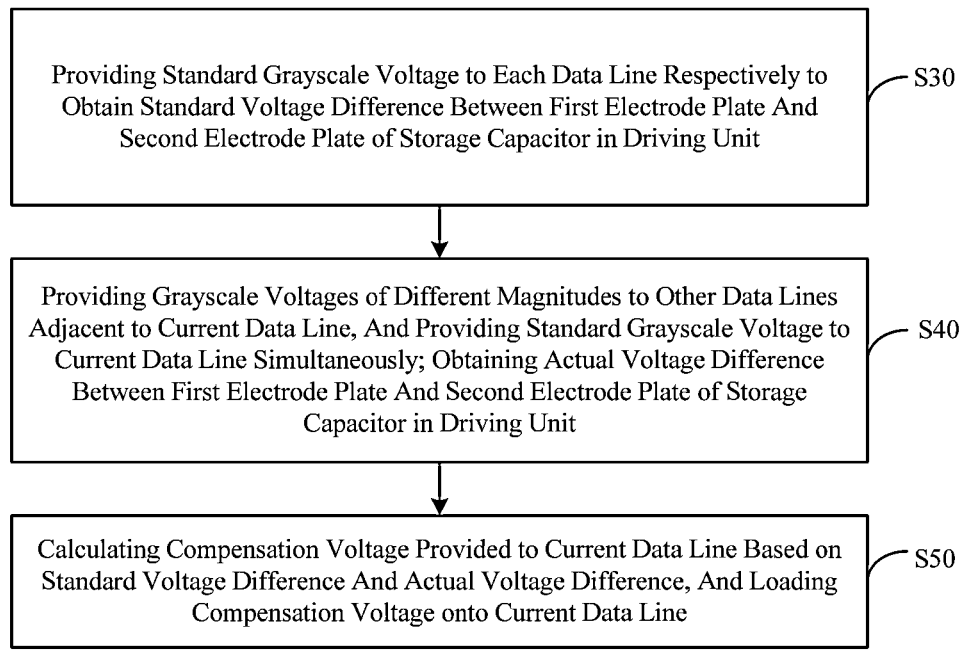
FIG. 9 is a flowchart showing step S30, step S40 and step S50 of the compensation method according to the second embodiment of the present disclosure.

Referring to FIG. 9, the compensation method further includes:

Step S30, providing a standard grayscale voltage to each the data line Dm respectively to obtain a standard voltage difference between the first electrode plate 11 and the second electrode plate 12 of the storage capacitor C1 in the driving unit 100; when the standard grayscale voltage is provided to the data line Dm, the voltage waveforms in the adjacent other data lines Dm are stable, for example, the voltages in the adjacent other data lines Dm are zero, avoiding that the electrical signals in the data line Dm are disturbed by the fluctuation of the electrical signal in the adjacent data line Dm+1. At this time, the standard voltage difference is a voltage difference that is not disturbed by the other data lines Dm.

Step S40, providing grayscale voltages of different magnitudes to other data lines Dm adjacent to a current data line Dm, and providing the standard grayscale voltage to the current data line Dm simultaneously; obtaining an actual voltage difference between the first electrode plate 11 and the second electrode plate 12 of the storage capacitor C1 in the driving unit 100. The gray scale voltages are usually 0-255, and similarly, the standard gray scale voltages are also 0-255. In order to detect the effect of the coupling capacitor C3 during actual operation, the 0-255 standard grayscale voltages are provided sequentially in accordance with the positions of the driving units 100 on the display panel 60, and at each time when a standard grayscale voltage is provided to the driving unit 100, 0-255 grayscale voltages are also provided to the adjacent other data lines Dm.

To illustrate the above steps in detail, an example is given. One of a plurality of driving units 100 is selected as a reference driving unit 100. When 0 grayscale voltage is provided to the reference driving unit 100, 0 grayscale voltage is provided to the adjacent data line Dm+1, the next actual voltage difference is recorded; when 0 grayscale voltage is guaranteed to be unchanged for the reference driving unit 100, 1 grayscale voltage is provided to the adjacent data line Dm+1, and thus continues, and when 0 grayscale voltage is guaranteed to be provided to the reference driving unit 100, 0-255 are input completely to the adjacent data line Dm+1 in sequence, and 256 actual voltage differences are recorded when the grayscale voltage of the reference driving unit 100 is 0.

Similarly, when 1 grayscale voltage is provided to the reference driving unit 100, 0-255 grayscale voltages are input to the adjacent data line Dm+1 in sequence, such that 256 actual voltage differences are recorded when the grayscale voltage of the reference driving unit 100 is 1. The actual situation of affection by different grayscale voltages of adjacent data lines Dm+1 when 0-255 grayscale voltages are input to the reference driving unit 100 is completed by the above process.

It should be noted that if the reference driving unit 100 is set at the edge, it is adjacent to a data line, and the number of actual voltage values is $2^{256}$. If the reference driving unit 100 is set in the middle, and the data line Dm is set on the left and right sides of the reference driving unit 100, and influences of the grayscale voltage of two left and right data lines need to be considered, the number of actual voltage values is $3^{256}$. $\Delta\Psi$ represents the actual voltage difference, and in $\Delta\Psi(a, b, c)$, a represents the grayscale voltage provided to the data line adjacent to the left side of the reference unit, b represents the grayscale voltage provided to the data line of the reference unit, and c represents the grayscale voltage that is provided to the data line adjacent to the right side of the reference unit. $\Delta\Psi(0, 200, 20)$ represents that 200 grayscale voltage is provided to the reference unit, 0 grayscale voltage is provided to the data line adjacent to the left side of the reference unit, and 20 grayscale voltage is provided to the data line adjacent to the right side of the reference unit.

Step S50, calculating a compensation voltage provided to the current data line Dm based on the standard voltage difference and the actual voltage difference, and loading the compensation voltage onto the current data line Dm. The actual voltage difference is a joint effect of the standard voltage difference and the coupling capacitor C3, and the actual effect of the coupling capacitor C3 can be known by comparing the standard voltage difference with the actual voltage difference. The coupling capacitor C3 is offset by loading the calculated compensation voltage onto the data line Dm. The method of eliminating the coupling capacitor C3 can also be periodically turned on for detection and compensation, referring to the periodic detection process of eliminating the parasitic capacitor C2.

In addition, the compensation voltage for offsetting the coupling capacitor C3 may be loaded by the controller 20 directly onto the data line Dm, or the controller 20 may load the compensation voltage onto the data line Dm via the driver chip 30.

Embodiment III

Figure 10:
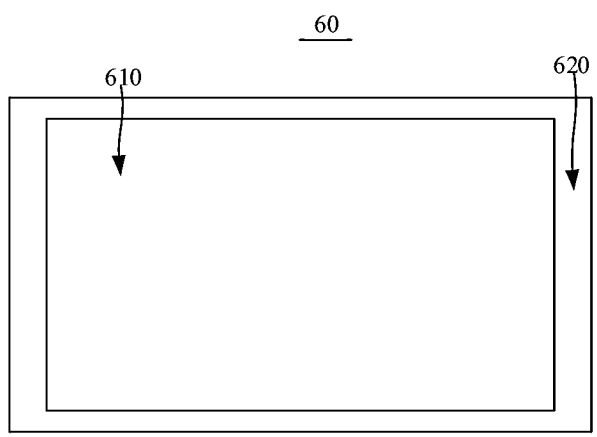
FIG. 10 is a schematic diagram showing a display panel according to a third embodiment of the present disclosure.

Referring to FIG. 10, the present disclosure also provides a display panel 60, the display panel 60 includes a light emitting unit 50 and a compensation circuit as above, the light emitting unit 50 is connected to the first end of the first response switch T1, the display panel 60 includes a display area 610 and a non-display area 620, the non-display area 620 is provided in a periphery of the display area 610, the subtractor 10 and the controller 20 are provided in the non-display area 620. The light emitting unit 50 is provided in the display area 610. The subtractor 10 and the controller 20 are provided in the non-display area 620 to avoid blocking light and affecting the display effect of the display image. The light emitting unit 50 may be provided in the display area 610.

The implementation and beneficial effects of the display panel are referred to the scheme of the compensation circuit described above and will not be repeated herein.

Other embodiments of the present disclosure will readily come to mind to those skilled in the art upon consideration of the specification and practice of the present disclosure disclosed herein. The present disclosure is intended to cover any variations, uses or adaptations of the present disclosure which follow the general principles of the present disclosure and include means of common knowledge or customary skill in the art not disclosed herein.

It is to be understood that the present disclosure is not limited to the precise construction which has been described above and illustrated in the accompanying drawings, and that various modifications and changes may be made without departing from the scope of the present disclosure. The scope of the present disclosure is limited only by the accompanying claims.

What is claimed is:

1. A compensation circuit, comprising:
   at least one driving unit,
   wherein each driving unit comprises a first response switch and a storage capacitor, wherein a first end of the first response switch is connected to a light emitting unit, and a second end of the first response switch is connected to a power supply;
   wherein the storage capacitor has a first electrode plate and a second electrode plate opposite to the first electrode plate, wherein the first electrode plate is connected to a control end of the first response switch, the second electrode plate is connected to the second end of the first response switch, and the control end of the first response switch is configured to light up the light emitting unit in response to a data signal provided by a data line;
   wherein the compensation circuit further comprises:
   a subtractor provided with a first detection port, a second detection port and an output port; and
   a controller provided with a receiving port and a feedback port;
   wherein the first detection port is connected to the first electrode plate and the second detection port is connected to the second electrode plate;
   wherein the receiving port of the controller is connected to the output port of the subtractor, and the feedback port of the controller is configured to provide a compensation signal to the data line; and
   wherein the subtractor is configured to calculate a voltage difference between a first voltage data of the first detection port and a second voltage data of the second detection port, and transmit the voltage difference to the controller, and the controller is configured to provide the compensation signal to the data line based on the voltage difference.

2. The compensation circuit according to claim 1, wherein each driving unit further comprises a second response switch, wherein a first end of the second response switch is connected to the data line, a second end of the second response switch is connected to a connection joint between the storage capacitor and the first response switch, a control end of the second response switch is connected to a scanning line, and the second response switch is configured to make the first end and the second end of the second response switch to be conducted in response to a scanning signal of the scanning line.

3. The compensation circuit according to claim 2, wherein a parasitic capacitor is provided between the control end of the first response switch and the second end of the second response switch.

4. The compensation circuit according to claim 2, wherein the second response switch is a TFT switch, and the first response switch and the second response switch each is an N-type TFT switch or a P-type TFT switch.

5. The compensation circuit according to claim 1, wherein the compensation circuit further comprises a driver chip, wherein the driver chip is connected to the data line to provide the data signal to the data line;
   wherein the feedback port of the controller is connected to the driver chip to provide a feedback signal to the driver chip, and the driver chip is configured to provide the compensation signal on a basis of the data signal according to the feedback signal; or
   the feedback port of the controller is connected to the data line to provide the compensation signal based on the data signal.

6. The compensation circuit according to claim 1, wherein the compensation circuit comprises a plurality of driving units, wherein the first detection port of the subtractor is connected to the first electrode plate in each driving unit respectively, the second detection port is connected to the second electrode plate in each driving unit respectively, and the feedback port of the controller provides the compensation signal to the data line in each driving unit respectively.

7. A display panel, comprising a light emitting unit and a compensation circuit according to claim 1, wherein the light emitting unit is connected to a first end of the first response switch, and the display panel comprises a display area and a non-display area, wherein the non-display area is provided at a periphery of the display area, the subtractor and the controller are provided at the non-display area, and the light emitting unit is located in the display area.

8. The compensation circuit according to claim 1, wherein the first response switch is a TFT switch, and the light emitting unit is an Organic light emitting Diode (OLED) unit.

9. The compensation circuit according to claim 1, wherein the first electrode plate and the first response switch are connected at a first point, and the second electrode plate and the first response switch are connected at second point; and the first detection port is directly connected to the first point, and the second detection port is directly connected to the second point.

10. The compensation circuit according to claim 1, wherein a plurality of driving units present a matrix distribution of rows and columns in a display panel; and one subtractor corresponds to one row of driving units or to one column of driving units.

11. A compensation method, applied to a compensation circuit, wherein the compensation circuit comprises: at least one driving unit,
wherein each driving unit comprises a first response switch and a storage capacitor, wherein a first end of the first response switch is connected to a light emitting unit, and a second end of the first response switch is connected to a power supply;
wherein the storage capacitor has a first electrode plate and a second electrode plate set opposite to each other, wherein the first electrode plate is connected to a control end of the first response switch, the second electrode plate is connected to the second end of the first response switch, and the control end of the first response switch is configured to light up the light emitting unit in response to a data signal provided by a data line;
wherein the compensation circuit further comprises:
a subtractor provided with a first detection port, a second detection port and an output port; and
a controller provided with a receiving port and a feedback port;
wherein the first detection port is connected to the first electrode plate and the second detection port is connected to the second electrode plate; and
wherein the receiving port of the controller is connected to the output port of the subtractor, and the feedback port of the controller is configured to provide a compensation signal to the data line;
wherein the compensation method comprises:
generating a detection instruction;
controlling the subtractor to obtain first voltage data of the first detection port and second voltage data of the second detection port based on the detection instruction,
calculating a difference between the first voltage data and the second voltage data to generate a voltage difference, and outputting the voltage difference to the controller;
controlling the controller to receive the voltage difference and generate the compensation signal based on the voltage difference; and
providing the compensation signal to the data line.

12. The compensation method according to claim 11, wherein controlling the controller to generate the compensation signal based on the voltage difference comprises:
extracting a preset reference standard value;
comparing the voltage difference with the preset reference standard value to generate a comparison result; and
generating the compensation signal based on the comparison result.

13. The compensation method according to claim 12, wherein the compensation circuit comprises a plurality of driving units, wherein the first detection port of the subtractor is connected to the first electrode plate in each driving unit respectively, and the second detection port is connected to the second electrode plate in each driving unit respectively;
wherein before extracting the preset reference standard value, the compensation method further comprises:
obtaining the voltage difference between a voltage of the first electrode plate and a voltage of the second electrode plate of the storage capacitor in each driving unit, respectively, and generating a reference table based on the voltage difference; and
selecting a maximum value from the reference table as the preset reference standard value, and saving the preset reference standard value.

14. The compensation method according to claim 13, wherein each driving unit further comprises a second response switch, a first end of the second response switch is connected to the data line, a second end of the second response switch is connected to a connection joint between the storage capacitor and the first response switch, and a control end of the second response switch is connected to a scanning line;
wherein before obtaining the voltage difference between the voltage of the first electrode plate and the voltage of the second electrode plate of the storage capacitor in each driving unit, respectively, the compensation method further comprises:
providing a scanning signal to the second response switch of each driving unit in turn, wherein the second response switch is configured to make the first end and the second end of the second response switch to be conducted in response to the scanning signal; and
providing a same amount of charge to the storage capacitor of each driving unit under a same conduction time of the first end and the second end of the second response switch.

15. The compensation method according to claim 13, wherein a plurality of data lines are provided, and the plurality of driving units are connected to the plurality of data lines one-in-one;
the compensation method further comprises:
providing a standard grayscale voltage to each the data line respectively to obtain a standard voltage difference between the first electrode plate and the second electrode plate of the storage capacitor in each driving unit;
providing grayscale voltages of different magnitudes to other data lines adjacent to a current data line, and providing the standard grayscale voltage to the current data line simultaneously;
obtaining an actual voltage difference between the first electrode plate and the second electrode plate of the storage capacitor in each driving unit; and
calculating a compensation voltage provided to the current data line based on the standard voltage difference and the actual voltage difference, and loading the compensation voltage onto the current data line.

16. The compensation method according to claim 13, wherein the plurality of driving units are arranged in a matrix-type arrangement in a row-column manner in a display panel, and after detecting each of the plurality of driving units by the subtractor, a voltage difference is obtained in each driving unit; and the differences are tallied together to generate the reference table, wherein the reference table is generated in conjunction with locations of the plurality of driving units.

17. The compensation method according to claim 13, wherein in response to that a reference driving unit is set at an edge and is adjacent to the data line, a number of actual voltage values is $2^{256}$; and in response to that a reference driving unit is set in a middle, and the data line is set on left and right sides of the reference driving unit, a number of actual voltage values is $3^{256}$.

* * * * *